United States Patent [19]

Whittaker

[11] Patent Number: 4,705,640

[45] Date of Patent: Nov. 10, 1987

[54] FLOCCULANTS AND PROCESSES FOR THEIR PREPARATION

[75] Inventor: Tony Whittaker, South Yorkshire, England

[73] Assignee: Allied Colloids Limited, United Kingdom

[21] Appl. No.: 728,782

[22] Filed: Apr. 30, 1985

[30] Foreign Application Priority Data

Apr. 30, 1984 [GB] United Kingdom ................. 8410971

[51] Int. Cl.$^4$ ............................................. C02F 1/56
[52] U.S. Cl. .................................... 210/733; 210/732; 210/734; 210/735; 210/738; 523/319; 524/922
[58] Field of Search ............... 210/725, 727, 728, 730, 210/732-736, 738; 523/319, 322, 323; 524/922; 525/326.1, 329.4

[56] References Cited

U.S. PATENT DOCUMENTS

| | | | |
|---|---|---|---|
| 3,210,308 | 10/1965 | Garms et al. | 210/736 |
| 3,278,506 | 10/1966 | Chamot et al. | 210/734 |
| 3,380,947 | 4/1968 | Galgoczi et al. | 523/323 |
| 3,480,761 | 11/1969 | Kolodny et al. | 210/734 |
| 3,536,646 | 10/1970 | Hatch et al. | 210/736 |
| 3,719,748 | 3/1973 | Manfroy et al. | 210/738 |
| 3,917,529 | 11/1975 | Madole et al. | 210/736 |
| 3,926,662 | 12/1975 | Rundell et al. | 210/734 |
| 3,977,971 | 8/1976 | Quinn et al. | 210/732 |
| 4,105,558 | 8/1978 | Heinrich et al. | 210/401 |
| 4,470,907 | 9/1984 | Sencza | 210/192 |
| 4,479,879 | 10/1984 | Hashimoto et al. | 210/738 |
| 4,529,794 | 7/1985 | Sortwell | 528/499 |
| 4,537,513 | 8/1985 | Flesher et al. | 422/278 |

FOREIGN PATENT DOCUMENTS

| | | | |
|---|---|---|---|
| 53-140275 | 12/1978 | Japan | 210/734 |
| 1310491 | 3/1973 | United Kingdom | 210/609 |

*Primary Examiner*—Peter Hruskoci
*Attorney, Agent, or Firm*—Ostrolenk, Faber, Gerb & Soffen

[57] ABSTRACT

The flocculation performance, for instance on low pressure or other pressure filtration (such as a belt press), of a solution of a high molecular weight organic polymeric flocculant having IV above 4 is improved by subjecting the solution to degradation, preferably by mechanical shear such as through a Silverson mixer or by a fast rotating blade.

12 Claims, No Drawings

FLOCCULANTS AND PROCESSES FOR THEIR PREPARATION

It is standard practice to flocculate a suspension of particulate material by addition to the suspension of a solution of organic polymeric flocculant. The step of flocculation may be used to facilitate various solids-liquids separation processes such as filtration (for instance high pressure or low pressure filtration), drainage (for instance of paper suspensions), settlement (for instance of various inorganic suspensions) or other dewatering, for instance dewatering of sewage sludges.

It is accepted as being essential that the flocculant polymer should be in the form of a stable solution, referred to herein as the flocculant solution, before it is contacted with the particulate material. Thus the polymer much reach a steady state of hydration and dissolution before the flocculant solution is mixed with the suspension. It is wholly unsatisfactory to add the flocculant solution to the suspension while the polymer in the solution is still changing from, for instance, a solid state to a dissolved state. Thus it is common practice to mix the polymer with most or all of the water that is to be present in the flocculant solution and then to allow this solution to age for a substantial time, for instance 30 minutes to 2 hours or longer, to allow dissolution to be completed and reach equilibrium. The resultant flocculant solution is then mixed with the suspension that is to be flocculated. Accordingly the overall process consists of the formation of the flocculant solution and, separately, the addition of this solution to the suspension, and often the stage of forming the flocculant solution includes a mixing stage followed by an ageing stage.

Organic polymeric flocculants first became significant in the industry in the 1950's. Initially they had a relatively low molecular weight because the quality of the monomers inhibited the formation of water soluble high molecular weight polymers of the types that are now available. Despite the low molecular weights that were available (initially typically below 500,000 on a commercial scale), the desirability of being able to use commercially, as flocculants, polymers having the highest possible molecular weight was well recognised, and there were frequent references in the literature to the organic polymer having a molecular weight as high as possible, typically having Intrinsic Viscosity (IV) above 6 dl/g. Modern techniques of monomer purification and polymerisation do permit the production of polymers having IV as high as, for instance, 30 (or up to 15 for cationics) provided processing and use conditions are controlled carefully.

It has been well recognised throughout this gradual development of high IV values that they would not be obtained if the polymer solution was subjected to chemical or physical forces that might degrade it, and in particular if it was subjected to mechanical shear. The fact that polymers could be degraded by such forces was known from, for instance, U.S. Pat. No. 3,021,269. In this disclosure, cross linked polymeric gels that are insoluble in water are subjected to ultrasonic energy to degrade them chemically to such an extent that they become soluble. The resultant polymers are said to have molecular weights up to 630,000, IV up to 2.54.

Accordingly, it has become conventional practice to synthesize the polymers very carefully so as to obtain the highest possible molecular weight and to handle the polymers carefully so as to avoid degrading them, and losing the difficulty obtained high molecular weight.

The polymers are initially synthesized, and supplied to the user, as a concentrated aqueous solution, a dispersion, or a powder and have to be converted into a dilute flocculant solution before they could be added to the suspension. A solution grade polymer is merely mixed with water and usually aged in a tank until required.

A powder grade polymer must be converted into a solution, precautions being taken to avoid agglomeration of the powder particles. The solution may be formed simply by stirring the powder vigorously into water or by, for instance, initially wetting the powder particles while suspended in air and then stirring the wetted particles into water. Whatever the method, this forms a dispersion in water of hydrating particles and this dispersion is left to stand, optionally with gentle agitation or stirring, to allow complete hydration and solution to occur.

Dispersions of polyelectrolyte in non-aqueous, water immiscible, liquid are stirred into water, sometimes with considerable agitation, to initiate hydration of the particles to form a suspension in water of hydrating particles, which is left to stand, optionally with gentle agitation, until the desired solution is formed.

The preparation of the solution therefore necessarily involves agitation and it was recognised that this had to be tolerated, especially when starting from powders or dispersions, in order to achieve a solution. However it was always kept to a minimum, to avoid damaging the polymer. For instance in U.S. Pat. No. 3,468,322 a suspension is mixed with water in a turbulence inducer which is said to provide good results without the use of severe or shearing agitation. In EP No. 0102759 a solution is made by blending a dispersion and water in an orifice mixer under shear but it is stated that the optimum conditions would apply the shear for an infinitely short time. In practice the shear is applied for a period of much less than 1 second. The amount of polymer degradation that might occur during this very short period is extremely low.

If there is an ageing stage in the formation of the flocculant solution, it is conventional for the solution to be under static or only gently moving conditions during the ageing.

Having formed the flocculant solution, it is necessary to combine it thoroughly with the suspension that is to be flocculated. It is essential that there should be rapid and intimate mixing of the solution with the suspension in order that there is a uniform polymer concentration throughout the suspension, so that uniform floc formation occurs. Inadequate mixing of the solution into the suspension would lead to variable concentration of polymeric flocculant and, in turn, very unsatisfactory results. It is therefore necessary to apply vigorous agitation and this is often described as involving shear, although it has been recognised that shear at this stage is a necessary evil and can itself damage the final results. For instance, BP 1,346,596 warns that shear at this stage may reduce flocculation. In practice, therefore, any shear that is applied has normally been of a very low value and applied for the shortest possible time consistent with the need to achieve intimate mixing.

Against this background it has been the assignee's practice, and it is believed the practice of all suppliers of high molecular weight organic polymeric flocculants, to aim for the highest possible molecular weight and then to avoid subjecting the polymer to process conditions that might reduce the molecular weight.

It has now surprisingly found that it is possible to improve the flocculation performance of a high molecular weight organic polymeric flocculant by subjecting the polymer to degradation after it is in the form of a stable solution in water. For instance, it was found that the flocculation performance can be improved by degrading the polymer to a lower IV, provided the IV of the final polymer is still high, generally above 4. This discovery is directly contrary to all commercial practice with modern, high molecular weight, polymeric flocculants.

In the invention, a flocculant solution of a high molecular weight organic polymeric flocculant having IV above 4 is formed and a suspension of particulate material is flocculated by addition of the solution to the suspension, and the flocculant solution is formed by blending high molecular weight organic polymeric flocculant in water to form an initial solution having a polymer concentration below 3% by weight and then the flocculation performance of the dissolved polymer is improved by subjecting the dissolved polymer to degradation. Since the polymer in the flocculant solution, that is to say the solution that is added to the suspension, has IV above 4 the extent of degradation is such that IV is above 4.

Each high molecular weight polymer is inevitably formed of a blend of molecules of a range of chain lengths and the degradation in the invention preferably reduces this range. The range of chain lengths can be defined in various ways. For instance it is termed polydispersity when it is defined by the weight average molecular weight divided by the number average molecular weight. A theoretical polymer consisting of molecules of a single chain length has a polydispersity value of 1 but in practice commercial polymers have values much higher than this. It had previously been assumed that high polydispersity values were acceptable, and indeed probably very desirable, for flocculation in view of the various mechanisms involved in achieving satisfactory flocculation. However in the invention, the degradation preferably reduces polydispersity by at least 5%, preferably at least 15%.

In preference to measuring polydispersity, it has been found convenient to define the spread of molecular weights by (Mw/Mv) or (Mz/Mw) where Mw is the weight average molecular weight, Mv is the viscosity average molecular weight and Mz is the z-average molecular weight, for instance as defined on pages 182 and 183 of volume 9 of Encyclopedia of Polymer Science & Technology published by Interscience. The values for (Mw/Mv) and for (Mz/Mw) can be derived from dynamic quasielastic light scattering methods. Although these methods are primarily designed for analysis of lower molecular weight polymers, they do give values showing the relationship between the molecular weight distribution of the molecules in a polymer before and after the degradation. Preferably the degradation results in (Mw/Mv) being reduced by at least 5%, typically 10 to 30% or more. Preferably the degradation results in (Mz/Mw) being reduced by at least 10%, typically 15 to 50% or more.

Although it is believed that reduction in the spread of molecular weights within the polymeric product is of particular importance in the invention, it has been surprisingly found that some reduction in IV (and therefore in molecular weight) generally is tolerable and that in many instances reduction in IV is beneficial, particularly if it is accompanied by a reduction in the spread of chain lengths of the polymer. The degradation is therefore often conducted under conditions such that the IV is reduced by at least 5% and often 10 to 30% or more, for instance up to 50 or 60%.

The ionicity of a polymer can be determined on a 0.1% aged solution by a Colloid Titration as described by Koch-Light Laboratories Ltd. in their publication 4/77 KLCD-1 (or alternatively a method as in BP No. 1,579,007 could possibly be used).

As explained in BP No. 1,579,007 ionic polymers often have a value less than 100% of the theoretical ionicity value. Although BP No. 1,579,007 associates inferior ionicity with non-random distribution of monomer units within the polymeric chain, it was surprisingly found that it is possible, particularly when the polymer includes some degree of chain branching or cross linking, to improve the ionicity value towards the theoretical maximum by the degradation step. We term this improvement ionicity regain (IR). $IR = (IAD - IBD)/IAD \times 100$ where IAD is the ionicity measured by the above-defined method after the degradation step of the invention and IBD is the ionicity before the degradation step. Especially when the polymer includes chain branching or cross linking the degradation step is preferably such that IR is greater than 5%, typically up to 20 or 30%. Preferably this IR is accompanied by a reduction in the spread of chain lengths within the polymer.

The degree of degradation must not be so high as to make the flocculation performance of the dissolved polymer worse than its performance before degradation. Very low amounts of degradation will have no measurable effect on the flocculation performance and too much degradation, for instance to reduce IV below 4, will make the flocculation performance worse but the flocculation performance will pass through a peak. Thus by subjecting the solution to the chosen method of degradation for varying periods and observing the flocculation performance it is easy to plot the performance against various levels of degradation and to select the optimum level of degradation.

The degradation can be by ultrasonic degradation or by chemical degradation. However these methods sometimes have the tendency to reduce molecular weight significantly without achieving the desired reduction in the spread of molecular weights within the polymer. Preferably the degradation is by mechanical degradation since this appears to reduce the spread of molecular weights, as well as often reducing IV and/or increasing ionicity for branched or cross linked polymers.

The mechanical degradation may be applied by subjecting the initial solution to the effect of fast moving blades, for instance blades having a velocity of at least 500 meters per minute, typically 750 to 5,000 meters per minute. If the blades rotates, then these velocities are the peripheral velocities of the blades. It is particularly preferred to use blades that rotate at high speed, generally above 2,000 rpm preferably 3,000 to 20,000 rpm. Suitable apparatus for this is the Waring blender or apparatus similar to large scale versions of kitchen blenders such as the Moulinex, Kenwood, Hamilton Beach, Iona or Osterizer blenders. Routine experimentation, as mentioned above, will easily determine the optimum duration at a given speed, or the optimum speed for a given duration, or the optimum combination of speed and duration.

Another suitable method of applying mechanical degradation is by forcing the solution by impellers through a screen, for instance as in a Silverson mixer or other mixer having a similar method of operation. For instance there may be an impellor 4 to 10 cm in diameter rotating at 1500 to 6000 rpm to force the solution under high shear through a screen. Preferably a Silverson 120L mixer is used and has a square hole high shear screen and an impellor of 6.8 cm diameter rotating at 3000 rpm. Mechanical agitation methods that do not generate a high degree of chopping are less satisfactory and, if used, must be used for prolonged periods in order to achieve any significant mechanical degradation. For instance extrusion of the solution through an orifice mixer or forcing it through centrifugal pump generally is unsatisfactory unless the solution is subjected to repeated passes through the mixer or pump.

In order to obtain optimum improvement in flocculation properties in a convenient manner, it is essential to conduct the degradation on the polymer while it is present as a solution having a polymer concentration below 3% by weight, i.e., while it is present as the said initial solution. Degradation conducted on polymer solutions of a higher concentration is difficult to perform, because of the viscous nature of the solutions, and is less satisfactory. Degradation conducted on the polymer before it is fully dissolved is also less satisfactory. Even though some shear may be applied during the preparation of the initial solution (for instance to facilitate dispersion of polymer particles into water) the shear applied at this stage is preferably inadequate to improve flocculation performance and, in any event, further improvement can be achieved, in accordance with the invention, by subjecting the resultant initial solution to the defined degradation. Preferably the initial solution is made by blending solid (e.g., bead or powder), dispersed or dissolved polymer with water to form a mixture containing below 3% by weight of the polymer, allowing this solution to age in a storage vessel for sufficient time for the dissolution to reach equilibrium (so that its flocculation properties no longer change with time) and then subjecting the aged solution to the degradation. The ageing period is usually at least 30 minutes, typically 1 to 5 hours, often about 2 hours. During ageing, the solution may be static or may be subjected to gentle stirring or other agitation.

The flocculation treatment of the invention is conducted with novel apparatus that includes means for applying the degradation. In particular, novel apparatus for dosing the flocculant solution into a suspension comprises a vessel for holding the aqueous suspension that is to be flocculated and having a dosing inlet for dosing the aqueous solution of flocculant into the suspension and supply means for supplying the flocculant solution to the inlet, the supply means including means for mechanically or otherwise degrading the solution after its formation and before it reaches the inlet. The vessel may be a tank or a line through which the suspension flows. Generally the solution has the desired solids content before it is subjected to degradation but means can be provided for diluting the solution after the degradation and before entry to the vessel.

The means for supplying the solution generally comprise a pipe leading from a tank in which solution is aged. The means for degrading the solution may be in-line. In-line means for mechanically degrading a solution may comprise a pump that will both provide the shear and force the flocculant solution to the dosing point, in particular it may be a silverson mixer that serves to degrade the solution and to force it to the dosing point. Alternatively the degradation may be applied in a tank or other vessel between the ageing tank and the dosing point.

The flocculant solution, at the dosing point, generally has a concentration of from 0.01 to 1%, often 0.05 to 0.3%, and if the initial solution, that is subjected to the degradation, has a higher concentration it is necessary to dilute it with water after the degradation step.

The polymer must initially have an intrinsic viscosity (IV), of a value such that, after degradation, IV is still above 4 and in practice this means that the polymer will generally have a molecular weight above 1 million, typically up to 30 million. Before the degradation, the polymer generally has IV at least 5, and preferably at least 9, for instance up to 15 or higher, e.g., up to 25 for anionics. In the flocculant solution, after the degradation, the IV is preferably at least 5 and generally in the range 6 to 12, often 6 to 9.

The polymer must be water soluble and is preferably substantially linear. The monomers from which it is formed are preferably substantially free of cross linking agent. It may be based on a natural or modified natural polymer. For instance it may be a cellulosic or gum polymer such as a cationic or other ionic derivative of a cellulose or an ionic derivative of guar gum.

Preferably however the polymer is a substantially linear synthetic polymer formed by polymerisation of one or more ethylenic, preferably vinyl, water soluble monomers. Broadly any monomer or monomer blend that can be polymerised to yield a water soluble flocculant polymer may be used. The monomers are generally acrylic (including methacrylic) monomers. The polymer may be non-ionic, being formed wholly from non-ionic monomers, but preferably is ionic since even non-ionic monomers generally include some ionic groups, for instance acrylic acid groups are often present in acrylamide. The amount and type of ionic charge in the monomers will be selected such that the polymer has the ionic charge suitable for the particular dispersion that it is to flocculate.

Suitable non-ionic monomers are acrylamide, methacrylamide, N-vinylmethylacetamide or formamide, vinyl acetate or vinyl pyrrolidone.

Suitable anionic monomers are sodium acrylate, methacrylate, itaconate, 2-acrylamidomethyl propane sulphonate, sulphopropylacrylate or methacrylate or other water soluble forms of these or other polymerisable carboxylic or sulphonic acids or sulphomethylated acrylamide may be used.

Suitable cationic monomers are dialkylaminoalkyl acrylates and methacrylates, especially dialkylaminoethyl acrylate, and their quaternary or acid salts, and dialkylaminoalkylacrylamides and methacrylamides and their quaternary or acid salts for instance methacrylamidopropyl trimethyl ammonium chloride and Mannich products, such as quaternised dialkylaminomethylacrylamides. Other suitable monomers include diallyldimethyl ammonium chloride, especially when copolymerised with acrylamide, and vinyl pyridine (as acid addition or quaternary salt) and Hoffman degradation products such as polyvinylamine.

The suspension may be an inorganic aqueous suspension but preferably is an organic aqueous suspension, with the organic particles most preferably being sewage but others, such as paper, can also be treated. The invention is of particular value in the treatment of sewage sludge.

The invention is generally used as part of a process for dewatering the suspension and so the flocculated suspension is normally subjected to dewatering. Although this can be by various methods, the invention is of particular value when applied to pressure filtration. This pressure filtration may be by high pressure filtration, for instance on a filter press at 5 to 15 bar for, typically, ½ to 6 hours but preferably is low pressure filtration, for instance on a belt press, generally at a pressure of 0.5 to 3 bar, typically 1 to 15 minutes.

The flocculation performance in such filtration techniques can be manifested by increased solids content in the filter cake. It has, however, been found that there is a close correlation between the capillary suction time (CST) of the flocculated suspension and its ultimate suitability for low or high pressure filtration and so in the invention it is convenient to determine flocculation performance by reference to CST, the best products having the lowest values.

CST is measured as described in Journal of Institute of Water Pollution Control Vol. 67, 1968, No. 2 page 233. This method involves adding a measured dose of flocculant solution to the suspension and applying a defined amount of shear for a measured time. The results are quoted at various dose/shear combinations, the dose being in g/m$^3$ and the shear being the time in seconds for which the shear was applied after addition of the flocculant solution. In this specification, IV is measured as described on page 13 of Water Research Centre Technical Report No. 6 "The Examination of Organic Flocculants and Coagulated Acids" but using IM NaCl and a Na$_2$HPO$_4$/citric acid buffer instead of acid or alkali for pH adjustment.

By the invention it is possible to obtain an improvement in the flocculation performance and in the dewatering ability of many types of suspensions although of course it is necessary to select the polymer to be suitable for the particular suspension being dewatered. If the polymer that is being used is inherently unsuitable for that suspension then the degradation treatment of the invention may be of little or no value.

A particular advantage of the invention is that it is possible, at a given IV, to obtain improved flocculation performance if that IV is achieved by degradation of a higher IV polymer than if the IV is achieved by direct synthesis. Accordingly, for a dispersion or apparatus where it is necessary for the polymer to have, for instance, IV 7 better results are generally obtained by mechanically shearing a higher IV polymer down to IV 7 than by synthesizing a polymer from the same monomers to that IV value.

The following are some examples of the invention. In these DMAEA is dimethylaminoethyl acrylate, q indicates that it is quaternised by methyl chloride, AM is acrylamide and Mannich products are dimethylaminomethyl acrylamide formed from acrylamide, formaldehyde and dimethylamine. IV and CST are recorded as defined above.

Low pressure piston press cake solids are recorded on a piston press operated to reproduce belt pressure filtration, wherein 0.7 bar is applied for 1 minute, 1.4 bar for 1 minute, 2.1 bar for 1 minute and then 2.8 bar for 6 minutes. Increased cake solids measured by this technique indicate that increased cake solids would be obtained on a belt press. High pressure piston press cake solids are recorded using the same piston press with the pressure being increased over 30 minutes up to 7 bar and then held at 7 bar for a further 30 minutes. Increased cake solids on this test indicates that increased solids would be obtained on a filter press.

Wherever reference is made to shearing a solution with a Moulinex homogeniser this is effected by providing 400 ml of the polymer solution in a substantially cylindrical pot having a diameter of about 8 cm and with a blade about 6 cm in diameter and about 1 mm thick rotating at 16,500 rpm in the base of the pot. One arm of the blade is inclined upwardly by about 45° and the other arm downwardly by about the same amount.

EXAMPLE 1

A dispersion grade DMAEAq/AM copolymer, was dissolved in deionised water and aged to give a 1% w/w active polyelectrolyte solution. The solution was then sheared in a Moulineux homogeniser with samples being taken after 6, 8, 10, 15 and 60 seconds. The results are shown in Table 1.

TABLE 1

| SHEARING TIME (SECS) | I.V. dl/g | CST (secs) 80/10 | 80/25 | 80/40 |
|---|---|---|---|---|
| NIL | 9.8 | 145 | 301 | 375 |
| 6 | 9.5 | 51 | 122 | 201 |
| 8 | 9.7 | 34 | 112 | 188 |
| 10 | 9.9 | 29 | 82 | 138 |
| 15 | 9.4 | 23 | 76 | 119 |
| 60 | 7.8 | 15 | 50 | 77 |

EXAMPLE 2

Four products, identified as A, B, C and D, having intrinsic viscosity 7.3, 6.8, 12.0 and 11.4 dl/g respectively and all known to be identical composition DMAEA/AM copolymers were made up as 1% w/v solutions and allowed to age. Two further solutions were prepared from products C and D by taking portions of the original solutions and subjecting them to 100 seconds of shearing in the Moulinex blender; these were labelled E & F and were subsequently found to be of I.V. 6.6 and 7.0 dl/g respectively. The six solutions were compared on three sludges by CST and by observing the solids content of piston press cakes. Sludge 1 was a Rotherham digested primary/activated sludge. Sludge 2 was a raw primary/activated sludge. Sludge 3 was a digested primary/humus sludge. The results are shown in Table 2.

TABLE 2

| Sludge Type | Product | IV | CST (secs) 125/10 | 125/25 | 125/40 | Low Pressure Piston Press Cake Solids (%) |
|---|---|---|---|---|---|---|
| 1 | A | 7.3 | 20 | 46 | 58 | 12.1 |
| 1 | B | 6.8 | 14 | 35 | 54 | — |
| 1 | C | 12.0 | 14 | 45 | 69 | 12.6 |
| 1 | D | 11.4 | 13 | 34 | 52 | 13.4 |
| 1 | E | 6.6 | 9 | 15 | 27 | 12.8 |
| 1 | F | 7.0 | 9 | 15 | 24 | 13.5 |
| 2 | A | 7.3 | 15 | 40 | 60 | — |
| 2 | B | 6.8 | 13 | 30 | 55 | 14.8 |
| 2 | C | 12.0 | 17 | 40 | 63 | 14.3 |
| 2 | D | 11.4 | 19 | 32 | 56 | 13.8 |
| 2 | E | 6.6 | 14 | 17 | 28 | 15.1 |
| 2 | F | 7.0 | 16 | 14 | 26 | 15.4 |
| 3 | A | 7.3 | 16 | 42 | 64 | 14.0 |
| 3 | B | 6.8 | 12 | 32 | 46 | 15.1 |
| 3 | C | 12.0 | 17 | 46 | 69 | 14.2 |
| 3 | D | 11.4 | 12 | 28 | 48 | 15.2 |

TABLE 2-continued

| Sludge Type | Product | IV | CST (secs) 125/10 | 125/25 | 125/40 | Low Pressure Piston Press Cake Solids (%) |
|---|---|---|---|---|---|---|
| 3 | E | 6.6 | 10 | 18 | 28 | 15.9 |
| 3 | F | 7.0 | 11 | 19 | 31 | 16.7 |

These results show the improvement in performance when the IV is obtained by shearing rather than by synthesis (compare polymers E and F with B and A) and the improvement in performance that is obtained when polymers are sheared to reduce their IV (compare polymers C and D with E and F).

When Mw, Mv and Mz values were recorded for polymers A and E by light scattering techniques, a reduction of about 15% in (Mw/Mv) is observed and a reduction of about 30% is observed in (Mz/Mw). On the scale used for the particular apparatus for this test (Mw/Mv) for polymer D was 1.574 and for polymer F 1.324 whilst (Mz/Mw) for polymer D was 3.296 and for polymer F 2.296. These values may, depending upon the theoretical assumptions required in their calculation, need multiplication by a factor X or X may be 1, the values then being absolute values. If the values are absolute values it indicates that novel polymers according to the invention should have (Mw/Mv) below 1.5, preferably below 1.4, and/or should have (Mz/Mw) below 3 and preferably below 2.5.

EXAMPLE 3

A further sample of solution C was degraded by subjecting it to 30 minutes of U.V. radiation in the presence of 2 ppm ferric ions (as FeCl$_3$). The resulting solution, labelled G, was found to have an intrinsic viscosity of 7.0 dl/g.

The solutions A, B, C, E and G were evaluated on a Digested primary/activated sludge using the C.S.T. technique. The results are shown in Table 3.

TABLE 3

| Product | IV | CST (secs) at the Dose/Shear shown 150/10 | 150/25 | 150/40 |
|---|---|---|---|---|
| A | 7.3 | 24 | 50 | 87 |
| B | 6.8 | 17 | 39 | 66 |
| C | 11.4 | 24 | 91 | 155 |
| E | 6.6 | 12 | 16 | 33 |
| G | 7.0 | 16 | 39 | 63 |

The results show that the chemically degraded sample G does not give as great an improvement in effectiveness as the sheared product E, but is better than the starting polymer.

EXAMPLE 4

A dispersion grade DMAEA/AM copolymer was dissolved in deionised water to give a 1% w/w solution. A portion of the solution was sheared in a Moulinex blender for 8 seconds.

Both solutions were compared over a dosage range on a 2% china clay suspension using jar tests. The results are shown in Table 4.

TABLE 4

| Product | IV dl/g | Settlement time (secs) at dose indicated (ppm) 0.5 | 0.75 | 1.0 | 1.25 |
|---|---|---|---|---|---|
| Unsheared | 10.8 | 117 | 73 | 53 | 40 |
| Sheared | 8.6 | 107 | 70 | 43 | 30 |

Products B and F from Example 2 were compared on a 2% china clay suspension as above. The results are shown in Table 5.

TABLE 5

| Product | Settlement time (secs) at dose indicated (ppm) 0.1 | 0.3 | 0.4 | 0.5 |
|---|---|---|---|---|
| B | 218 | 144 | 124 | 90 |
| F | 200 | 125 | 110 | 78 |

These results show that shearing cationic polyelectrolytes gives improved flocculation of inorganic suspensions, but the improvement may not be as great as with organic suspensions.

EXAMPLE 5

Two solid grade NaAc/AM copolymers labelled H and I and having intrinsic viscosities of 12.1 dl/g and 10.1 dl/g respectively were prepared as 0.5% w/w solutions.

A product of identical composition to the above with an intrinsic viscosity of 25.0 dl/g was also prepared as a 0.5% w/w solution. Two portions of this solution were sheared in a Moulinex blender for 40 seconds and 70 seconds; these were labelled J and K and were found to have intrinsic viscosities of 12.1 and 10.5 respectively.

Products H, I, J and K were compared on a 2% china clay suspension over a dosage range using jar tests. The results are shown in Table 6.

TABLE 6

| | IV | Settlement time (secs) at dose indicated (ppm) 0.1 | 0.3 | 0.4 | 0.5 |
|---|---|---|---|---|---|
| H | 12.1 | 183 | 89 | 59 | 41 |
| I | 10.1 | 183 | 104 | 80 | 57 |
| J | 12.1 | 180 | 69 | 44 | 27 |
| K | 10.5 | 180 | 72 | 46 | 33 |

This demonstrates the benefit of shearing upon flocculation performance of an anionic polymer on an inorganic suspension.

EXAMPLE 6

A portion of solution C was diluted to a 0.1% w/v solution with deionised water.

The original and diluted solution were in turn degraded in a Moulinex blender with samples being taken at suitable time intervals and evaluated on a digested primary/activated sludge. The results are in Table 7.

TABLE 7

| 1% w/v solution | | | 0.1% w/v solution | | |
|---|---|---|---|---|---|
| Shear (secs) | IV (dl/g) | CST at 80/25 | Shear (secs) | IV (dl/g) | CST at 80/25 |
| 0 | 11.4 | 63 | 0 | 11.4 | 63 |
| 30 | — | 43 | | | |
| 60 | — | 37 | 2 | — | 40 |
| 90 | — | 35 | 4 | — | 36 |
| 120 | 6.8 | 28 | 6 | 6.9 | 29 |

A 1.5% solution required shearing for 240 seconds to achieve similar IV and CST values.

This demonstrates that the desired results can be achieved much more quickly when shearing more dilute solutions.

EXAMPLE 7

Two parts by weight of a dispersion of 50% q DMAEA/AM copolymer in 50% oil containing stabiliser and surfactant was dispersed into 98 parts water using the Moulinex homogeniser. Once the aqueous system appeared to be of uniform composition, the shearing was stopped and the solution aged with tumbling for 2 hours. It was then sheared in accordance with the invention for various times and the CST values recorded, as shown in Table 8.

TABLE 8

| Shear (secs) | CST at 100/25 |
| --- | --- |
| 0 | 114 |
| 3 | 104 |
| 6 | 70 |
| 9 | 48 |
| 12 | 28 |

This clearly demonstrates the beneficial effect of applying shear to the aged flocculant solution, even though some shear may have been used in its initial manufacture.

EXAMPLE 8

A sample of solution C diluted to 0.1% was given one pass through an in-line Silverson mixer at a flow rate of one liter/min, this being 10% of the pumps maximum throughput. The resulting sheared solution was compared with the original sample and also sample B (IV 6.8) on a digested primary/activated sludge.

TABLE 9

| Product | IV dl/g | CST (secs) | | |
| --- | --- | --- | --- | --- |
| | | 125/10 | 125/25 | 125/40 |
| C | 11.4 | 28 | 65 | 82 |
| C(sheared) | 7.0 | 12 | 28 | 47 |
| B | 6.8 | 26 | 69 | 89 |

This shows that this shearing technique is also effective.

EXAMPLE 9

A solution of 41:59 wt % DMAEAq/AM polymer was sheared in a Moulinex blender with samples taken at suitable intervals to test their effectiveness.

TABLE 10

| Shear time (secs) | IV (dl/g) | CST (secs) at 100/25* |
| --- | --- | --- |
| 0 | 7.8 | 171 |
| 2 | — | 117 |
| 4 | — | 100 |
| 6 | — | 89 |
| 10 | — | 71 |
| 15 | 6.4 | 48 |
| 30 | — | 51 |
| 45 | — | 53 |
| 90 | 5.2 | 67 |

*Average of three readings

This shows that effectiveness reaches a maximum after a certain duration of shear and that continued shearing (and continued reduction of IV) can lead to reduced effectiveness.

EXAMPLE 10

Two liquid grade Mannich products (dimethylaminomethylacrylamide polymer quaternised with dimethyl sulphate) A and B of identical composition were diluted in deionised water to give 1% w/v solutions and found to have 1% solution viscosities of 71 cps and 55 cps respectively.

A portion of solution A was then sheared in a Moulineux blender and samples taken after 6 seconds, 16 seconds and 22 seconds.

Each of the samples was then evaluated on a digested primary/activated sludge for effectiveness by CST. The viscosity was recorded of the 1% solutions using spindle No 2 at 100 rpm. The results are shown in Table 11.

TABLE 11

| Product | Viscosity | CST | | |
| --- | --- | --- | --- | --- |
| | | 150/10 | 150/25 | 150/40 |
| A | 71 | 34 | 81 | 107 |
| +6s shear | 66 | 23 | 59 | 97 |
| +16s shear | 58 | 20 | 43 | 67 |
| +22s shear | 55 | 15 | 32 | 50 |
| B | 55 | 35 | 80 | 106 |

This shows that better results are obtained at a given viscosity when the solution has been sheared.

EXAMPLE 11

40 g newsprint, 10 g Manilla and 5 g corrugated paper were disintegrated in 2 l of water to give a standard waste stock of 2.5% consistency. This stock was diluted to 0.5% d/d solids and one liter aliquots treated with 200 g per ton d/d flocculant. Three different chemical types of copolymer were used. Each type was used unsheared, sheared to a lower I.V. and unsheared but having a similar low I.V., shearing in each instance was by a Moulinex homogeniser.

The flocculated stock was transferred into a Schopper-Riegler Freeness tester whose back orifice had been blocked off. The drainage rate was measured by timing the collection of 500 cm$^3$ water. The results are shown in Table 12.

TABLE 12

| Product | I.V. (dl/g$^{-1}$) | Drainage time for 500 cm$^3$ (secs) |
| --- | --- | --- |
| 60/40 w/w DMAEAq/AM | 12.0 | 16 secs |
| 240 secs shear | 6.5 | 21 secs |
| No shear | 6.6 | 25 secs |
| 40/60 w/w DMAEAq/AM | 11.3 | 16 secs |
| 100 secs. shear | 7.5 | 21 secs |
| No shear | 7.8 | 26 secs |
| 27.6/72.2 w/w DMAEAq/AM | 14.0 | 20 secs |
| 40 secs. shear | 7.0 | 22 secs |
| No shear | 7.1 | 25 secs |

This shows that the sheared products give much improved results compared to unsheared products of similar I.V.

EXAMPLE 12

A solid grade DMAEA/ACM copolymer having IV 11.8 was made up as solution A at 1% w/v. Part of this solution was sheared for 100 seconds in the Moulineux blender to produce solution B. The solutions were compared for high pressure filtration by adding 125 g/m$^3$ of the polymer to a primary/activated sludge and then dewatering this at high pressure on a piston press. Solution A gave 21.8 solids content and solution B 25.6% solids content. This demonstrates the better dewatering effect obtained at high pressure using the sheared solution.

EXAMPLE 13 qDMAEA/AM copolymer is made by copolymerisation of monomers contaminated with cross linking agent. The polymer has IV 10. A 0.1% solution of the polymer in water is sheared in the Moulinex mixer for 5 minutes. The cationicity of the polymer is measured before and after the shearing and the cationicity regain is calculated, all as defined above. After shearing for one minute the regain is 5% and after shearing for 5 minutes it is 9%. The sheared solution is a very effective flocculant.

I claim:

1. A process for flocculating an aqueous suspension of particulate material comprising forming a flocculant solution of a water soluble substantially linear organic polymeric flocculant having intrinsic viscosity (IV) greater than 4 dl/g and a molecular weight about 1 million by blending a water soluble substantially linear organic polymeric flocculant having IV greater than 5 dl/g with water to form an initial solution having a polymer concentration below 3% by weight, in which the polymeric flocculant is a soluble polymer formed from one or more ethylenically unsaturated monomers selected from the group consisting of acrylamide, methacrylamide, N-vinyl methyl acetamide, N-vinyl methyl formamide, vinyl acetate, vinyl pyrollidone, water soluble forms of carboxylic or sulphonic acids selected from acrylic acid, methacrylic acid, itaconic acid, and 2-acrylamido methyl propane sulphonic acid, sulpho propyl acrylate, sulpho propyl methacrylate, sulpho methylated acrylamide, dialkylaminoalkyl acrylates and methacrylates and their quaternary or acid salts, and dialkylaminoalkyl acrylamides and methacrylamides and their quaternary or acid salts, then improving the flocculation performance of the polymer by subjecting the dissolved polymer to degradation while dissolved in the solution for a period sufficient to improve said flocculation performance, flocculating said particulate material by addition of an effective amount of the flocculant solution to said aqueous suspension and separating the flocculated particulate material from the suspension.

2. A process according to claim 1 in which the dissolved polymer is subjected to chemical, ultrasonic or mechanical degradation while dissolved in the solution.

3. A process according to claim 1 in which the degradation is effected by subjecting the initial solution to mechanical shear for a period sufficient to improve flocculation performance.

4. A process according to claim 1 in which the degradation is effected by forcing the initial solution through a Silverson-type mixer or by chopping the initial solution with a blade that rotates at a peripheral velocity above 500 m/min.

5. A process according to claim 1 in which the initial solution of the polymer is formed by blending the polymeric flocculant in solid, dispersed or dissolved form with water and then allowing the resultant solution to age for at least 30 minutes.

6. A process according to claim 1 in which the degradation reduces the IV of the polymeric flocculant by at least 5%.

7. A process according to claim 1 in which the degradation reduces the IV of the polymeric flocculant by 10 to 50%.

8. A process according to claim 1 in which the degradation reduces weight average molecular weight/viscosity average molecular weight by at least 5%.

9. A process according to claim 1 in which the solution of organic polymeric flocculant having IV above 4 is formed by blending the polymeric flocculant in solid, dispersed or dissolved form with water to form a solution containing below 2% by weight of the polymer, allowing the solution to age, and then subjecting the solution to mechanical shear for a period sufficient to reduce weight average molecular weight/viscosity average molecular weight by at least 5%.

10. A method according to claim 9 in which the flocculated particulate material is separated by pressure filtration or belt press filtration.

11. A process according to claim 9 in which the water soluble substantially linear organic polymeric flocculant is formed from one or more monomers selected from the group consisting of dialkylaminoalkyl(meth)acrylates and their quaternary or acid salts, dialkylaminoalkyl(meth)acrylamides and their quaternary or acid salts, water soluble salts of acrylic acid, water soluble salts of 2-acrylamidomethyl propane sulfonic acid and acrylamide.

12. A method according to claim 1 in which the flocculated particulate material is separated by pressure filtration or filtration on a belt press.

* * * * *